2,087,185

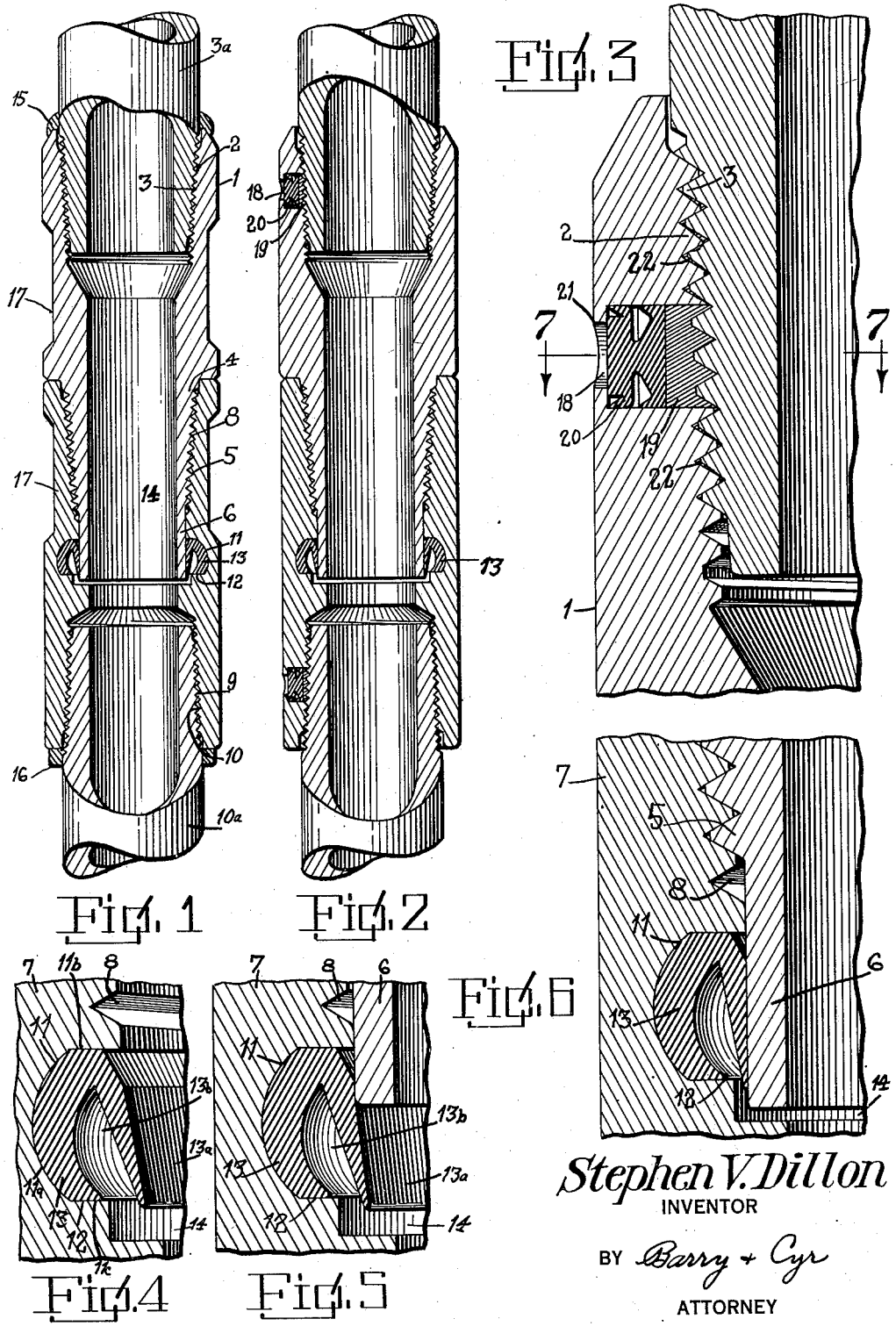

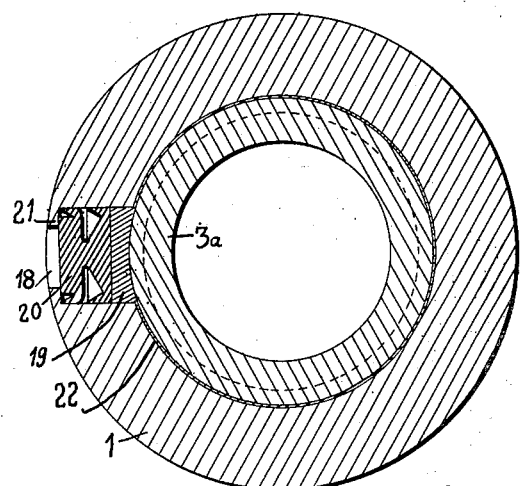
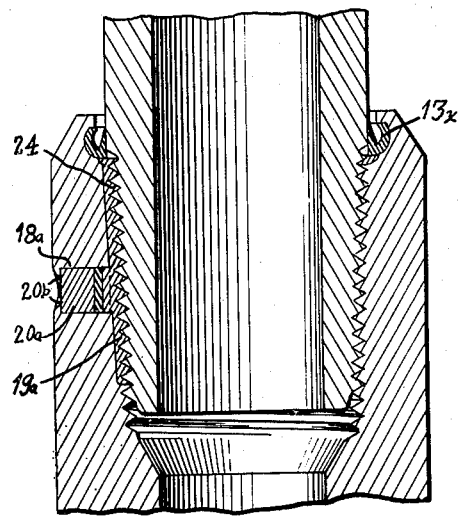
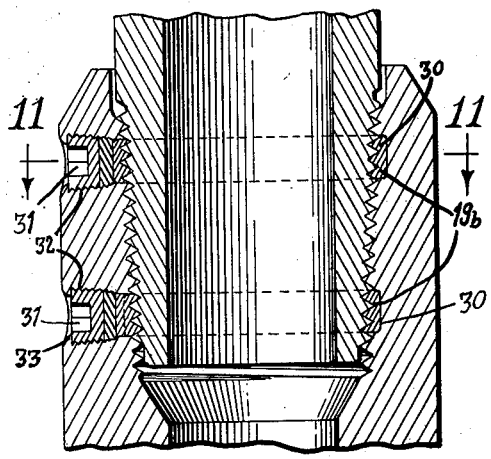
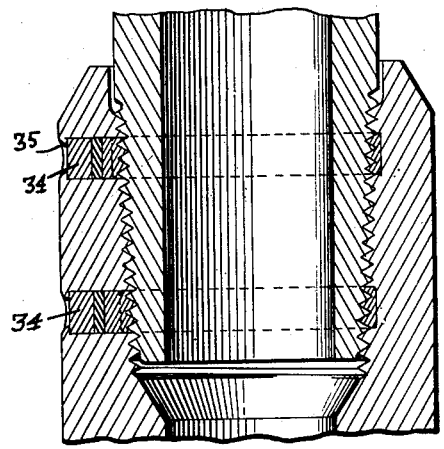
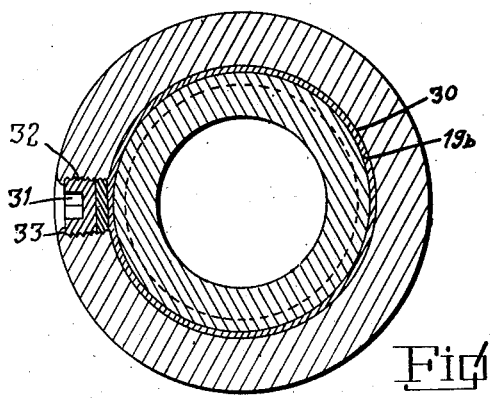
Stephen V. Dil
INVENTOR
BY Barry & G
ATTORNEY Patented July 13, 1937

UNITED STATES PATENT OFFICE 2,087,185

WELL STRING

Stephen V. Dillon, Tulsa, Okla.

Application August 24, 1936, Serial No. 97,714

11 Claims. (Cl. 285—146)

This invention relates to improvements in well strings, and more particularly to novel joints for use in tubular drilling or pumping strings.

It is well known in the oil production industry that the joints connecting the sections of drill pipe or pumping strings are liable to failures due principally to vibrations set up during the drilling or pumping operations. During the past several years, various improvements have been made in the tool joints used in such operations, and most of these improvements have been directed to the prevention of leakage through the threaded joints. So far as I am aware, no one has heretofore proposed to prevent movement between the parts of the threaded joints and to thereby eliminate the effect of vibrations.

The primary object of my invention is to provide a tool joint which will not only prevent vibrations from forming fluid courses along the threads, but will also seal any openings between the threads to eliminate breaks or washouts.

A further object is to furnish a tool joint which will prevent the corrosive action of drilling mud or other well fluids from promoting fatigue failure.

With the foregoing objects outlined and with other objects in view which will appear as the description proceeds, the invention consists in the novel features hereinafter described in detail, illustrated in the accompanying drawings, and more particularly pointed out in the appended claims.

In the drawings:

Fig. 1 is a longitudinal sectional view partly in elevation, of a portion of a well string, and illustrating one form of my improved joint.

Fig. 2 is a similar view of a modification.

Fig. 3 is an enlarged longitudinal sectional view of a detail of the structure shown in Fig. 2.

Fig. 4 is a similar view illustrating a special form of packing gasket used in the box of the joint.

Fig. 5 is a similar view but illustrating the manner in which the inner end of the pin contacts the gasket as the pin is screwed into the box.

Fig. 6 is a view like Fig. 5 and showing the position of the parts after the pin has been completely screwed into the box.

Fig. 7 is a horizontal view of the structure shown in Fig. 2, the section being taken on the line 7—7 of Fig. 3.

Figs. 8, 9 and 10 are vertical sectional views of modifications.

Fig. 11 is a horizontal sectional view taken on the line 11—11 of Fig. 9.

Before proceeding with a detail description of the invention, it may be mentioned that the box and pin of tool joints are usually carefully machined and depend largely upon close shoulder to shoulder contact of these members to prevent leakage through the joint. However, the drill or other well pipe is ordinarily not equipped with a carefully machined shoulder to provide a leaktight joint where said pipe is threaded into the members of the tool joint and must, therefore, depend upon close contact between the threads on the pipe and joint for prevention of leakage. Consequently, when the parts of the string are assembled in the field, there is likelihood of loosening of the threads between the pipe and joint due to vibration or other movement developed during the use of the pipe with the result that there is a movement of drilling mud or other well fluid into the interstices between the threads, thereby causing corrosion or erosion of the threads with consequent undesirable leakage of the fluid from the pipe. I eliminate the movement of this corrosive medium along the threads in the following way. Referring to the drawings, 1 designates the pin which, as usual, is provided at one end with internal threads 2 for engagement with the threads 3 of a section 3a of drill pipe. The opposite end of the pin is provided with a substantially conical extension 4 having external threads 5 and an elongated substantially cylindrical projection or tip 6 which extends beyond the threads.

The box 7 is provided at one end with internal threads 8 which engage the threads 5 of the pin, and the opposite end of the box has internal threads 9 to engage internal threads 10 on another section 10a of the pipe.

For the purpose of preventing movement of the drilling or other well fluid between the threads 5 and 8, I provide the box with an annular cavity 11 preferably having a curved wall 11a merging into substantially parallel upper and lower surfaces 11b and 11c. This cavity acts as a support 12 for a gasket 13 of special construction. The gasket is of substantially inverted U-shape in diametrical section, and the outer leg of the inverted U is curved to correspond with the wall 11a of the cavity, while the inner leg 13a is of substantially wedge shape and normally forms a frusto-conical or flaring surface within the gasket. Consequently, when the pin is screwed into place, its cylindrical extension or tip 6 will engage the inner surface of the gasket and will act to expand the leg 13a with the result that a tight frictional contact will be made between the parts 6 and 13a.

Due to the inverted U-shape of the gasket, an annular cavity 13b is formed within the gasket, and the well fluid flowing through the passageway 14 of the well string can enter the cavity 13b and function to press the legs of the gasket into contact with the box 7 and the extension 6 of the pin.

I have found from actual practice that this construction forms an effective seal between the box and pin, and prevents well mud from reaching the threads 5, 8, and as these threads are made very precise, they tightly fit one another and therefore, vibrations will not act to form fluid paths along these threads.

For the purpose of preventing the drilling or other well fluid from passing between the threads of the box and pin, and the threads of the pipe sections, I provide annular lines of welding 15 and 16 at the ends of the joint for effectively locking the pipe sections to the joint, and thereby eliminate the results of vibrations which might be likely to move the parts away from one another sufficiently to allow the well fluid to affect the threads.

The exterior of the members 1 and 7 are preferably provided with plane surfaces 17 to facilitate turning of these parts by wrenches in making or breaking the joint.

Instead of employing the welded joints 15 and 16, I prefer to introduce a low melting point metal between the threads of the pipe sections and the joint, not only for sealing purposes, but to prevent vibrations from forming openings between the threads. This is best illustrated in Figs. 2, 3 and 7. In these figures, it will be noted that the box and pin each has a diametrical aperture 18 leading to the internal threads at the outer end portion of the same. Into each aperture, I introduce molten metal which will flow along the threads of the pipe section and joint, and effectively seal the threaded joint, as shown at 22. The only sealing metals which I employ are those which have a melting point above any temperature that might be encountered in actual practice. Such temperatures generally do not range above 120° F. After the metal has been introduced in molten condition, any suitable means may be employed for closing the hole 18. For example, a gasket 19 of rubber or the like may be introduced into the hole and may be held in place by an expandible resilient plug 20, which is compressed into the hole 18 until it passes an annular shoulder 21, whereupon it expands and becomes seated against dislodgment by said shoulder.

Such a construction positively prevents the formation of openings or mud paths between the threads, and at the same time seals any openings originally formed, and this functions to prevent breaks or washouts.

To facilitate the flow of the metal to the threads, I may provide a longitudinal groove 24 in the box or pin, as illustrated in Fig. 8. Such groove will extend lengthwise of the drilling string preferably from a point near the outer end of the pin or box to a point terminating short of the last few threads of the threaded socket, as clearly shown in Fig. 8. Of course, the groove will communicate with the hole 18a so that the molten metal 19a introduced through the hole will flow along the groove to the threads of the pipe section and pin or box, and will then pass along the threads for tightly sealing the joint. A gasket 13x similar to the ones illustrated in Figs. 4 and 5 may be used at the outer end of the pin or box to form a seal between a pipe section and the pin or box, and to prevent corrosive fluids on the exterior of the well string from reaching the metal 19a. Any suitable plugging means 20a may be employed to seal the hole 18a, and if desired, the metal of the box or pin may be peened as shown at 20b to hold the plugging means in position.

Instead of forming a groove lengthwise of the pin or box, I may provide annular grooves 30 in these parts, as shown in Figs. 9 and 11 to allow for the introduction of the molten metal 19b. These grooves will be interposed in the threads of the box or pin, and they will be spaced from the ends of the threads, as shown in Fig. 9. After the molten metal has been introduced through holes 31, these holes may be closed by threaded plugs 32, and the plugs may be secured in position by peening the metal of the pin or box, as shown at 33.

In Fig. 10 I have shown a construction similar to that in Fig. 9, but cylindrical plugs 34 are employed for sealing the holes through which the molten metal was introduced, and these plugs are also held in place by peening, as shown at 35.

It is believed the construction and advantages of my invention will be readily understood from the foregoing description when taken in connection with the accompanying drawings, and it is manifest that many modifications of the invention will be apparent to those skilled in the art. Therefore, it is intended that all matters contained in the above description or shown in the drawings shall be interpreted as illustrative and not in a limiting sense.

What I claim and desired to secure by Letters Patent is:

1. In a tubular well string, a pin having external threads from which extends a tip having a substantially smooth outer surface, a box having internal threads engaging the threads of the pin and provided with an annular recess surrounding said tip, a resilient gasket seated in said recess and having an annular portion normally engaging the substantially smooth surface of the pin and held under compression by said tip, pipe sections threaded respectively into the outer ends of the box and pin, and metallic seals for preventing movement of the well fluid along the threads between the drill pipe and the box and pin.

2. In a tubular well string, a pin having external threads from which extends a tip having a substantially smooth outer surface, a box having internal threads engaging the threads of the pin and provided with a recess surrounding said tip, a resilient gasket seated in said recess and having an annular portion normally engaging said substantially smooth surface of the pin and held under compression by the tip, said gasket having a substantially angular cavity communicating with the passageway through the pin and box to permit fluid under pressure passing through the joint to force the inner and outer portions of the gasket into tight contact with the tip and box respectively, pipe sections having threaded connections with the box and pin, said threaded connections forming clearance spaces, and a low melting point metal filling the clearance spaces and sealing the joints between the pipe sections and the box and pin.

3. In a tubular well string, a pin member having external threads and a tip with a substantially smooth outer surface, a box member having internal threads engaging the threads of the pin and provided with a recess surrounding said tip, a resilient gasket seated in said recess against movement axially of the joint and having an annular portion normally engaging said substantially smooth surface of the tip, said gasket having an internal cavity communicating with the passageway through said members to allow fluid under pressure passing through the string to press said annular portion of the gasket against the tip and another portion against the box member, one of said members having additional threads, a pipe section having threads engaging said additional threads of the last-mentioned member, the additional threads of said last-mentioned member and of the pipe section forming clearance spaces, and a low melting point metal filling the clearance spaces and sealing the joint between the pipe section and the last-mentioned member, said last-mentioned member having an aperture for the introduction of said low melting point metal, and plugging means closing said aperture.

4. In a well string, a tool joint member having threads, a pipe section having threads engaging the threads of the tool joint member, said threads forming clearance spaces, a low melting point metal filling the clearance spaces and sealing the joint between the pipe section and tool member, said tool joint member being provided with an aperture for the introduction of said sealing metal, a resilient gasket arranged in said aperture, and a plug arranged in the aperture and holding the gasket in position.

5. In a well string, a tool joint member having threads, a pipe section having threads engaging the threads of the tool joint member, said threads forming clearance spaces, a low melting point metal filling the clearance spaces and sealing the joint between the pipe section and tool member, said tool joint member being provided with an aperture for the introduction of the sealing metal, said member forming a shoulder adjacent to the outer end of said aperture, and plugging means closing said aperture and held in place by said shoulder.

6. In a well string, a tool joint member having threads, a pipe section having threads engaging the threads of the tool joint member, said threads forming clearance spaces, a low melting point metal filling the clearance spaces and sealing the joint between the pipe section and tool member, said tool joint member being provided with an aperture for the introduction of said sealing metal and having a shoulder arranged adjacent to the outer end of said aperture, and plugging means in said aperture including a resilient plug held in place by said shoulder.

7. In a drilling string, a tool joint member having internal threads, a section of drilling pipe having external threads engaging the threads of said member, an annular groove in said member dividing some of the threads of the member from other threads of the member, and a low melting point metal occupying said groove and engaging threads of the section of drilling pipe, an aperture in said member for the introduction of said metal, and means for plugging said aperture.

8. In a drilling string, a tool joint member having internal threads, a section of drilling pipe having external threads engaging the threads of said member, an annular groove in said member dividing some of the threads of the member from other threads of the member, a low melting point metal occupying said groove and engaging threads of the section of drilling pipe, said member being provided with an aperture for the introduction of the metal into said groove, and means including a threaded plug for closing said aperture.

9. In a drilling string, a tool joint member having internal threads, a section of drilling pipe having external threads engaging the threads of said member, an annular groove in said member dividing some of the threads of the member from other threads of the member, a low melting point metal occupying said groove and engaging threads of the section of drilling pipe, said member being provided with an aperture for the introduction of the metal into said groove, and means for plugging said aperture including a plug held in place by a peened portion of said member.

10. A tool joint for tubular well strings, comprising a tubular pin and a tubular box, said pin and box having interengaging threads and the pin having a substantially cylindrical tip extending beyond the threads into the box, and an annular gasket in the box, tightly engaging said cylindrical extension and functioning to prevent a well fluid passing through the joint from reaching said threads, said gasket being of substantially inverted U-shape in diametrical section and having an inner and outer leg, the inner leg normally tending to move toward the axis of the string and to provide a flaring mouth to receive said cylindrical extension of the pin, pipe sections threaded respectively into the outer ends of the box and pin, and metallic seals for preventing the movement of well fluids along the threads between the drill pipe and the box and pin.

11. A tool joint for tubular well strings, comprising a tubular pin and a tubular box, said pin and box having interengaging screw threads and the pin having a substantially cylindrical tip extending beyond the threads into the box, said box having an annular cavity arranged beyond the threads and surrounding said tip, an annular gasket seated in the cavity, held under compression by the peripheral surface of said cylindrical extension and functioning to prevent a well fluid passing through the joint from reaching said threads, said gasket being of substantially inverted U-shape and having a central cavity communicating with the passageway through the joint, said gasket forming a plurality of annular lips adapted to be forced toward the tip and box respectively by fluid under pressure passing through the joint.

STEPHEN V. DILLON.